May 21, 1946.  A. MAJLINGER ET AL  2,400,559

INDUCTANCE DEVICE

Filed Nov. 25, 1942

INVENTORS  A. MAJLINGER
B. E. STEVENS
BY
*C. K. Sprague*
ATTORNEY

Patented May 21, 1946

2,400,559

UNITED STATES PATENT OFFICE 2,400,559

INDUCTANCE DEVICE

Anthony Majlinger, Astoria, N. Y., and Bruce E. Stevens, Demarest, N. J., assignors to Bell Telephone Laboratories, Incorporated, New York, N. Y., a corporation of New York Application November 25, 1942, Serial No. 466,856

1 Claim. (Cl. 171—119)

This invention relates to an inductance device and particularly to a retardation coil for use in a filter for rectified alternating current.

An object of the invention is to improve the operating characteristics of an inductance device over a range of values of unidirectional current flowing through its winding.

Another object of the invention is to increase the inductance of an inductance device at a maximum value of direct current flowing through its winding while maintaining at a high value the ratio of its inductance at zero direct current energization to its inductance at a maximum value of direct current energization.

It is common practice to supply current from a rectifier employing one or more grid controlled gas-filled tubes, for example, to a load through a filter having one or more sections, each section comprising inductance in series with respect to the load and capacitance in shunt with respect to the load. When the alternating current supply voltage is steady and a fixed bias is applied to the grid or grids of the rectifier tube or tubes, each rectifier tube will pass space current during a portion of a cycle of the alternating current supplied to the rectifier, that is, during a half cycle when the grid is at a minimum negative potential and during one-quarter cycle when the grid is at a maximum value of negative potential. When the negative grid potential is increased beyond this maximum value, no space current flows during any part of the cycle. In such an arrangement, the load voltage decreases with increase in load current.

In known arrangements for minimizing variations in load voltage, biasing voltage applied to the grid of a gas-filled rectifier tube is changed in accordance with changes in load voltage. The range of load voltage over which such a regulating arrangement is effective is limited, however, since the period during which the rectifier tube passes space current can be varied only from one-quarter to one-half of each cycle of the alternating current source. To improve the load voltage regulation it is desirable to employ in the first filter section an inductance element the inductance of which is considerably higher for low values of load current than it is for high values of load current. However, it is also desirable that the inductance element have considerable inductance at high loads so that the filter will function to suppress alternating components of the current from the rectifier.

It is pointed out in United States Patent 1,876,451 to R. Gurtler, September 6, 1932, for example, that the inductance of an iron cored choke or transformer diminishes to a small value as the direct current through its winding is increased and that it is possible to increase to a maximum value the inductance at a relatively high value of direct current by providing an airgap having a reluctance $R_2$ such that the sum of $R_2$ and $R_1$ has a minimum value of reluctance to alternating components of the flux, $R_1$ being the reluctance of the iron portion of the core. In a choke coil or transformer so designed, however, the inductance of the device at relatively low values of direct current through its winding is approximately the same as the inductance at relatively high values of direct current.

In accordance with an embodiment of the invention herein shown and described for the purpose of illustration, an inductance device is provided with a core having at least two closed paths for the flux set up due to current flowing in a winding of the device. The flux paths are preferably separated by a sufficient distance to cause the flux in either of said paths to be substantially independent of the flux in the other of said paths, the one path being a complete path of magnetic material and the other being of magnetic material except for a short gap which is devoid of magnetic material and which completely separates adjacent portions of the magnetic material in the path. In some cases, however, it is desirable to separate the flux paths by a shorter distance but in any device embodying the invention the distance should be greater than that for which the core has a maximum reluctance to flux due to constant direct current in the winding. Specifically the inductance device comprises a three-legged core with a winding around the middle leg and the core comprises four sections made up of laminated magnetic material, the sections being separated by spacers of non-magnetic material. The laminations of the two outer sections are arranged so that no gap is formed in the magnetic paths while the laminations of the two inner sections are arranged to provide gaps in the magnetic paths which are shorter than the spacing between adjacent sections.

In the accompanying drawing.

Figure 1:
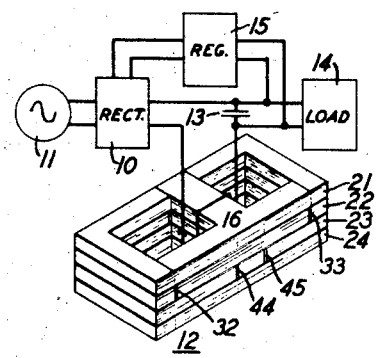
Fig. 1 is a diagrammatic view of a circuit including an inductance device in accordance with the present invention.
Figure 2:
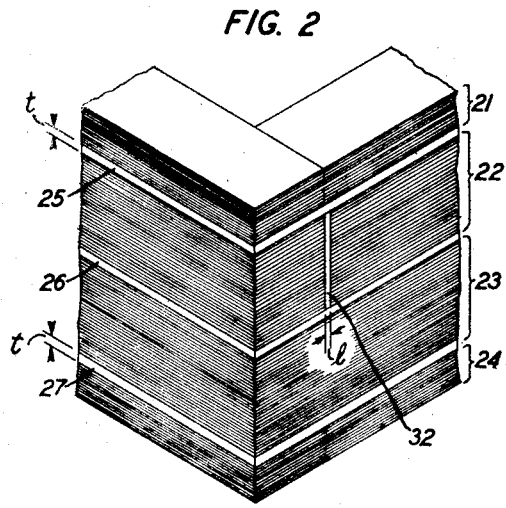
Fig. 2 is an enlarged fragmentary view in perspective of the core of the inductance device shown in Fig. 1.

Referring now to the drawing, there is shown a rectifier 10 for rectifying current from an alternating current source 11 and a filter circuit comprising a series retardation coil 12 and a shunt condenser 13 through which current from rectifier 10 is supplied to a load 14. The rectifier 10 may be of the type employing gas-filled tubes the grid biasing potential of which may be varied to control the output of the rectifier. A regulator 15 connected across the load is provided for maintaining the load voltage substantially constant and circuit connections from the regulator to the rectifier are provided for impressing upon the grids of the gas-filled tubes of the rectifier a voltage set up in the regulator circuit 15. A regulated rectifier circuit of the type illustrated in Fig. 1 is shown and described in greater detail in an application of J. A. Potter and D. E. Trucksess, Serial No. 466,860, filed November 25, 1942 (Patent No. 2,377,370, June 5, 1945).

Figure 3:
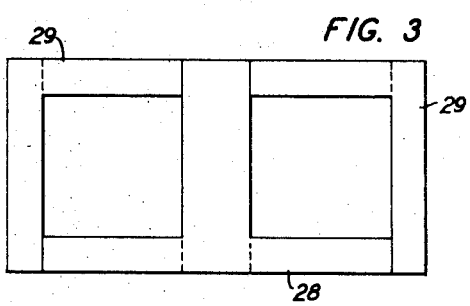
Fig. 3 is a plan view of a layer of laminations of the outer sections of the core of the inductance device shown in Figs. 1 and 2.

The retardation coil 12 comprises a three-legged core structure having a winding 16 around the middle leg. The core is made up of laminations of magnetic material of equal thickness arranged in four sections 21, 22, 23 and 24 adjacent ones of which are separated by spacers 25, 26 and 27, respectively, of a non-magnetic material such as vulcanized fiber. Each of the outer sections 21 and 24 are made up of twelve T laminations 28, and twenty-four L laminations 29 of silicon steel, there being one T lamination and two L laminations in each layer, as shown in Fig. 3. The T and L laminations in alternate layers are reversed with respect to each other so that the butt joints formed by the laminations of one layer are not in alignment with the butt joints formed by the laminations of adjacent layers. The flux path for each of the two outer sections 21 and 24 of the core is a complete path of magnetic material, that is, the flux path has no air-gap, or equivalent gap of non-magnetic material, which, if present, would need to be traversed by the flux in the path. Of course there are minute gaps at the butt joints and between laminations which cannot be avoided but these gaps are negligible in so far as the present invention is concerned and may, therefore, be ignored.

Figure 4:
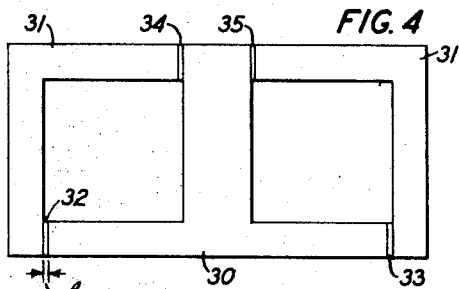
Fig. 4 is a plan view of a layer of laminations of one of the inner sections of the core of the inductance device shown in Figs. 1 and 2.
Figure 5:
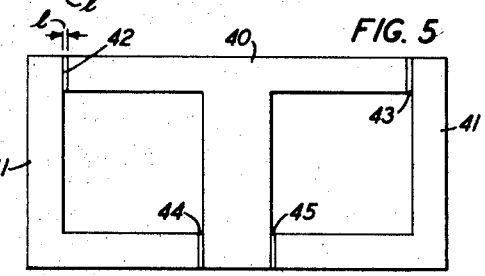
Fig. 5 is a plan view of a layer of laminations of another inner section of the core of the inductance device shown in Figs. 1 and 2.

Each of the inner core sections, 22 and 23, is made up of approximately forty-four T laminations and eighty-eight L laminations of silicon steel. The T laminations 30 and L laminations 31 of section 22 are all arranged as shown in Fig. 4 to leave air-gaps at 32, 33, 34 and 35. The T laminations 40 and L laminations 41 of section 23 are all arranged as shown in Fig. 5 to leave air-gaps at 42, 43, 44 and 45. The air-gaps are preferably filled with spacers of a non-magnetic material such as vulcanized fiber. Thus no gap formed at section 22 is in alignment with a gap in section 23. Specifically, the length $l$ of each of gaps 32, 33, 34, 35, 42, 43, 44 and 45 is .040 inch and the distance $t$ of each of spacings 25 and 27 is .0625 inch. The spacing 26 is also .0625 inch.

Figure 6:
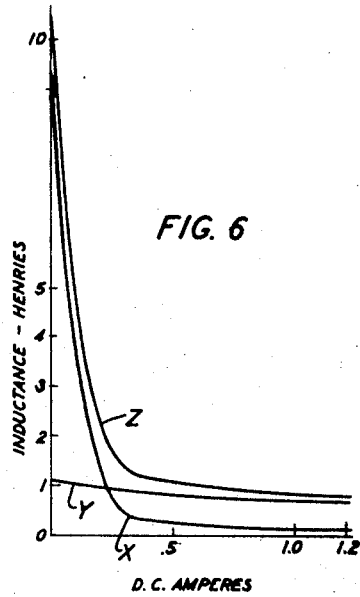
Figs. 6 and 7 consist of curves to which reference will be made in the following description of the invention.

The curve $z$ of Fig. 6 shows the relationship between the inductance of the retardation coil 12 and the direct current through its winding. As shown by the curve, the inductance at zero direct current is about 10 henries and the inductance at 1.2 amperes direct current is about 0.8 henry. The curve $x$ shows the inductance which the inductance device would have if only the sections 21 and 24 having no air-gap were used as the core. The inductance would then vary from about 9.0 henries at zero direct current to about 0.1 henry at 1.2 amperes direct current. If only the core sections 22 and 23 which have air-gaps were used, the inductance would be about 0.7 henry at 1.2 amperes direct current and would be only slightly higher at zero direct current as shown by curve $y$.

Figure 7:
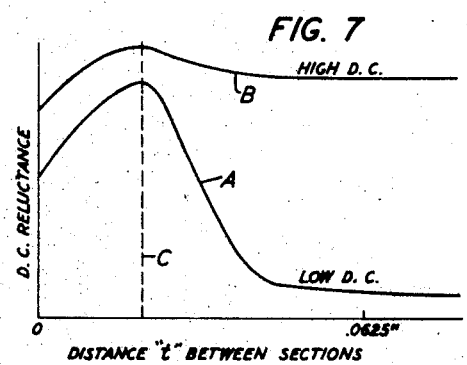

The curves A and B of Fig. 7 show the relationship between the thickness $t$ of each of spacers 25 and 27 and the reluctance of the core to direct current flux set up therein due to different amplitudes, respectively, of direct current flowing in the winding 16. It will be observed that, starting with $t$ equal to zero, as $t$ is increased the direct current reluctance increases to a maximum value for a certain value of direct current in the winding and then decreases, the direct current reluctance finally reaching a substantially steady value. For values of $t$ less than that indicated by the vertical dash line C, the ratio of direct current reluctance with high direct current in the winding to direct current reluctance with low direct current is relatively small with respect to the ratio for values of $t$ greater than that indicated by the line C. For values of $t$ greater than that indicated by line C, the direct current reluctance shown by curve A falls much faster than that shown by curve B as $t$ is increased. Therefore to obtain a large ratio of direct current reluctance with high direct current to direct current reluctance with low direct current, in accordance with the present invention, it is necessary to make $t$ greater than that value of $t$ for which the direct current reluctance is a maximum for a certain value of direct current in the winding. It has been found that, when the thickness $t$ of spacers 25 and 27 is greater than the thickness indicated by the line C in Fig. 7, the inductance of the retardation coil 12 is much greater at low values of direct current through its winding than it is at relatively high values of direct current and that the inductance at high values of direct current is considerably greater than the value of inductance which it would have if only the sections without air-gaps were to be employed.

What is claimed is:

The combination with a retardation coil device, having a winding with a magnetic core, of means for causing direct current the amplitude of which varies over a certain range to flow through said winding, said core comprising two separate sections providing two separate closed flux paths, the first of said sections being of magnetic material and of relatively large cross-sectional area and having therein a series gap of fixed length devoid of magnetic material, the second of said sections being of magnetic material and of relatively small cross-sectional area and devoid of any series gap, the self inductance of said device due solely to said first section being, for the uppermost part of said range, at least several times that due solely to the second section and, for the lower-most part of said range, a relatively small fraction of that due solely to the second section, the amplitude of the current within the upper portion of said range being sufficient to at least partially saturate said second section.

ANTHONY MAJLINGER.
BRUCE E. STEVENS.